US012168717B2

(12) United States Patent
Chen et al.

(10) Patent No.: US 12,168,717 B2
(45) Date of Patent: Dec. 17, 2024

(54) SEMI-AROMATIC POLYAMIDE RESIN AND PREPARATION METHOD THEREFOR

(71) Applicants: ZHEJIANG NHU SPECIAL MATERIALS CO., LTD., Zheijang (CN); ZHEJIANG NHU CO., LTD., Shaoxing (CN)

(72) Inventors: Zhirong Chen, Zhejiang (CN); Hong Yin, Zhejiang (CN); Hangjun Deng, Zhejiang (CN); Guiyang Zhou, Zhejiang (CN); Danqi Zhu, Zhejiang (CN); Xiaoxiao Wu, Zhejiang (CN); Wengang Hong, Zhejiang (CN); Guisheng Qiu, Zhejiang (CN); Qichuan Li, Zhejiang (CN)

(73) Assignees: ZHEJIANG NHU SPECIAL MATERIALS CO., LTD., Zhejiang (CN); ZHEJIANG NHU CO., LTD., Zhejiang (CN)

( * ) Notice: Subject to any disclaimer, the term of this patent is extended or adjusted under 35 U.S.C. 154(b) by 639 days.

(21) Appl. No.: 17/416,587

(22) PCT Filed: Nov. 20, 2019

(86) PCT No.: PCT/CN2019/119738
§ 371 (c)(1),
(2) Date: Jun. 21, 2021

(87) PCT Pub. No.: WO2020/134735
PCT Pub. Date: Jul. 2, 2020

(65) Prior Publication Data
US 2022/0025120 A1    Jan. 27, 2022

(30) Foreign Application Priority Data

Dec. 26, 2018  (CN) ......................... 201811601770.6

(51) Int. Cl.
C08G 69/48    (2006.01)
C08G 69/26    (2006.01)
C08G 69/28    (2006.01)
C08L 77/06    (2006.01)

(52) U.S. Cl.
CPC ........... C08G 69/48 (2013.01); C08G 69/265 (2013.01); C08G 69/28 (2013.01); C08L 77/06 (2013.01)

(58) Field of Classification Search
CPC ...... C08G 69/265; C08G 69/26; C08G 69/28; C08G 69/42; C08L 77/06
See application file for complete search history.

(56) References Cited

U.S. PATENT DOCUMENTS

| 3,173,898 A | 3/1965 | Sum |
| 3,691,131 A | 9/1972 | Kelmchuk et al. |
| 3,860,558 A | 1/1975 | Klemchuk |
| 3,941,752 A * | 3/1976 | Kleiner ...................... D01F 6/84 260/DIG. 24 |
| 5,154,881 A | 10/1992 | Rutz et al. |
| 5,744,433 A | 4/1998 | Storstrom et al. |
| 5,750,603 A * | 5/1998 | Asrar ...................... C08G 69/42 528/321 |
| 5,917,004 A * | 6/1999 | Liedloff ............... C08K 5/3435 528/331 |
| 2010/0055455 A1 | 3/2010 | Dauer et al. |

FOREIGN PATENT DOCUMENTS

| CA | 2248123 A1 | 10/1997 |
| CN | 1238790 A | 12/1999 |
| CN | 101180342 A | 5/2008 |
| CN | 101768354 A | 7/2010 |
| CN | 103289081 A | 9/2013 |
| CN | 103694693 A | 4/2014 |
| CN | 103890040 A | 6/2014 |
| CN | 104072759 A | 10/2014 |
| CN | 106700064 A | 5/2017 |
| CN | 107325548 A | 11/2017 |
| CN | 109749080 A | 5/2019 |
| EP | 475400 A1 | 3/1992 |
| EP | 0827976 A2 | 3/1998 |
| GB | 543843 A | 3/1942 |
| JP | 1972016549 A | 3/1971 |
| JP | H04159327 A | 6/1992 |
| JP | H10120781 A | 5/1998 |
| JP | 2002514256 A | 5/2002 |
| JP | 2012014772 A | 1/2012 |
| JP | 2014503632 A | 2/2014 |
| JP | 2015500360 A | 1/2015 |
| JP | 2016521792 A | 7/2016 |
| JP | 2016526597 A | 9/2016 |
| WO | 02083345 A1 | 10/2002 |
| WO | 2005007727 A1 | 1/2005 |
| WO | 2018049808 A1 | 3/2018 |

OTHER PUBLICATIONS

International Search Report and Written Opinion for PCT/CN2019/119738. Date of mailing: Mar. 4, 2020.

* cited by examiner

Primary Examiner — Ana L. Woodward
(74) Attorney, Agent, or Firm — Young Basile Hanlon & MacFarlane, P.C.

(57) ABSTRACT

The present disclosure discloses a semi-aromatic polyamide and a preparation method therefor. The semi-aromatic polyamide is obtained by polymerization reaction using a diamine, a dibasic acid and a monoacid as main raw materials while adding a special end-capping agent. The semi-aromatic polyamide prepared according to the present disclosure has good thermal stability, a yellowness index of less than 20, a glass transition temperature of 90° C. or above, and a melting point of 300° C. or above, and can be applied to spare parts for fuel pipelines in automobiles, and electronic and electrical industries such as LED panels.

20 Claims, 4 Drawing Sheets

SEMI-AROMATIC POLYAMIDE RESIN AND PREPARATION METHOD THEREFOR

CROSS-REFERENCE TO RELATED APPLICATIONS

This application is a 371 National Stage Entry of the International Application No. PCT/CN2019/119738, published as WO2020/134735, filed on 20 Nov. 2019, which claims priority to Chinese Application No. 201811601770.6 filed on 26 Dec. 2018.

TECHNICAL FIELD

The present disclosure relates to a semi-aromatic polyamide resin and a preparation method therefor, and in particular provides a thermally stable semi-aromatic polyamide resin added with specific end-capping agents and a preparation method therefor, and the thermally stable semi-aromatic polyamide resin may be applied to automobile parts and electronic parts, especially LED panels.

BACKGROUND

Polyamide, also referred to as nylon, is a generic term for high polymers containing amide groups (—NHCO—) in the repeating groups in the main chain of macromolecules, and it is the one with the largest yield, the most varieties and the widest versatility among engineering plastics. Notwithstanding good comprehensive properties, aliphatic polyamides, such as nylon 6 and nylon 66, do not have the thermal property that meets the requirements for high-temperature working environments, which restricts their application in high-tech fields.

Owing to an aromatic ring introduced into the molecular chain of the polyamide, semi-aromatic polyamides have greatly improved heat resistance, mechanical properties, water absorption, chemical resistance, etc., in comparison to universal PA6 and PA66. Semi-aromatic polyamides mainly have the following characteristics: (1) high glass transition temperature and good heat resistance; (2) good thermal-oxidative ageing resistance: (3) good electrical insulation properties; and (4) low water absorption and good dimensional stability of the article. Therefore, with the rapid development of modern high technology, semi-aromatic polyamides are used more and more widely. Semi-aromatic polyamides are widely applied in the fields of electrical/electronic parts, automobile parts, etc. Specifically, in automobile industry, peripheral parts of an engine compartment (i.e., components under a hood) are exposed to high-temperature environment (higher than 120° C.) for a long period of time, thereby setting a higher demand for the long-term thermal stability of polyamides. In the process of manufacturing LED housings, there is usually a need to solder the circuit board at about 260° C. by means of SMT reflow soldering method, therefore, the polymer used should not only have sufficient heat resistance and withstand reflow soldering without blistering, but also have high UV light stability and thermal stability, and good long-term stability under operating conditions.

There have been a lot of reports on synthesis of polyamides. For example, the literatures GB543843A and U.S. Pat. No. 3,173,898 have reported that phosphoric acid and divalent phosphates are used as catalysts during the polymerization process. Literature CN1238790 has reported that the use of an ultra dry gas having a dew point below 30° C. in combination with a phosphorus-containing SPP catalyst (2(2'-pyridyl)ethyl phosphonic acid or hypophosphite) significantly increases the rate of solid state polymerization at a relatively low reaction temperature, thereby obtaining a PA66 high polymer.

It has been reported in the literatures EP0475400, CA2248123 and US2010055455A1 that preparing polyamide compositions by adding currently known heat stabilizers and antioxidants such as hindered phenols improves the thermal stability and oxidation resistance of polyamides, which are applied to composite parts of aircraft engines.

The literature EP0827976 has reported a partially aromatic polyamide composition with improved thermal stability. The heat stabilizer is a mixture of an alkali metal halide and a copper (1) halide with a most preferred weight ratio of from about 8:1 to about 10:1, and the amount of the copper-containing stabilizer is from 50 ppm to about 1000 ppm based on the polyamide. The thermal ageing test at 220° C. shows that the time taken to lose 50% of the mechanical strength in the case of adding the copper-containing heat stabilizer is 2 to 3 times longer than that in the case of not adding a heat stabilizer.

The literature CN107325548A has reported that adding no more than 2% by mass of a monovalent or divalent copper compound, a copper aliphatic carboxylate, a secondary aromatic amine, and sterically hindered phenols or a mixture of several of them as heat stabilizers can increase the thermal stability of the resin. Literatures WO2018049808A1 and CN 103694693A have reported the use of hindered phenols, hydroquinones and phosphites as well as substituted hindered phenols, hydroquinones and phosphites, copper halides, iodine compounds and the like as the heat stabilizers of PA66 polyamide compositions to improve the thermal stability and ageing resistance of the PA66 compositions.

The literature WO2005/007727A1 has reported that adding elemental iron as a heat stabilizer to polyamide can enable the polyamide to exhibit better retention rate of mechanical properties at a high temperature. Literature CN103890040A has proposed to modify polyamide resins by adding metal oxides, so that the polyamide compositions maintain high mechanical strength, long-term oxidation resistance and high heat resistance, and are mainly used for LED articles.

The literatures CN101180342A, WO02083345A1, U.S. Pat. Nos. 5,744,433A and 5,154,881A have reported common polyamide oligomers, which are formed by different structures and have non-reactive phenol or amine end groups and a molecular weight between 800 and 5000 g/mol. They are often used to be blended with polyamide resins to improve the fluidity, viscosity stability and hydrolysis stability of the polyamide resins.

Nevertheless, there still remain the following problems regarding the preparation processes of the existing thermal-stable polyamides.

(1) Catalysts used for preparing most polyamide resins are inorganic phosphorous acid, hypophosphorous acid, and metal salt compounds thereof. The thermal stability and ageing resistance of polyamides are improved mainly by adding and blending heat stabilizers, antioxidants and the like to prepare polyamide compositions, and when the finished product is used at a high temperature for a long time, the catalyst, the heat stabilizer, the antioxidant and the like are prone to migrate, and it is impossible to achieve the purpose of having long-term oxidation resistance and thermal stability.

(2) The heat stabilizers added contain heavy metal salts, which are potentially harmful to the environment.

(3) The addition of polyamide oligomers may reduce the heat distortion temperature of the polyamide resin composition, which affects its use in fields requiring resistance to high temperature.

Therefore, it can be appreciated that there is still room for further improvement in the research on polyamides with excellent characteristics in this field.

SUMMARY

Problems to be Solved by the Disclosure

In order to solve the above-mentioned problems existed in the prior art, an object of the present disclosure is to provide a semi-aromatic polyamide capable of maintaining long-term thermal stability and preventing additives such as heat stabilizers and antioxidants from migrating during use, while avoiding using heat stabilizers (as additives) that are potentially harmful to the environment.

Another object of the present disclosure is to provide a method for preparing a semi-aromatic polyamide capable of maintaining long-term thermal stability and preventing heat stabilizers, antioxidants and the like from migrating, and a resin composition containing the semi-aromatic polyamide as well as an article thereof.

Means for Solving the Problems

After repeated studies, the present inventors have discovered that the above-mentioned problems can be addressed by adding specific end-capping agents in the polymerization reaction process for preparing the semi-aromatic polyamide.

The end-capping agents include a reactive group-containing polycondensation catalyst represented by the following formula (I) and a reactive group-containing hindered phenolic antioxidant represented by the following formula (II). The inventors have had the findings as below. Not only can the catalyst participate in the polymerization reaction process and increase the polymerization reaction rate, but the catalyst itself is capable of reacting with an amine end group, and upon completion of the reaction, it becomes a low-valent phosphine-containing end group of the polymer. Moreover, such a structure is capable of bringing about improved antioxidative effect. Next, the reactive group-containing hindered phenolic antioxidant may also react with an amine end group, so that the antioxidant can be uniformly distributed and fixed in the polymer in an in-situ reaction to avoid the phenomenon that the antioxidant becomes ineffective due to its migration to the surface when heated. As a result, the above-mentioned end-capping agents of the present disclosure are capable of maintaining the long-term thermal stability of the polymer and avoiding the migration of traditional small molecule additives (heat stabilizers, antioxidants, etc.) from the resin matrix during processing and use.

The outline of the present disclosure is as shown in items [1] to [20] below.

[1]. The present disclosure firstly provides a semi-aromatic polyamide having structural units derived from a diamine, a dibasic acid and a monoacid and having end-capped structures derived from the following formula (I) and formula (II), wherein the formula (I) is selected from compounds represented by the following formula (I-1) and/or formula (I-2):

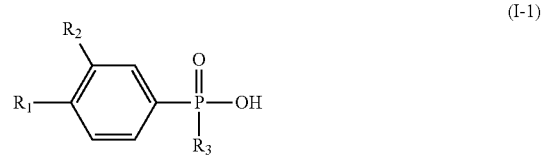

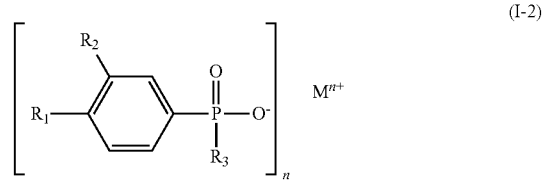

wherein $R_1$ is a carboxyl group, or a carboxyl-substituted $C_1$-$C_{10}$ alkyl group, preferably a carboxyl-substituted $C_1$-$C_4$ alkyl group; $R_2$ is a $C_1$-$C_4$ alkyl group or H, preferably H; $R_3$ is selected from a $C_6$-$C_9$ aryl group or H, preferably a $C_6$-$C_8$ aryl group; and $M^{n+}$ is selected from +1- and +2-valent metal cations;

the formula (II) is:

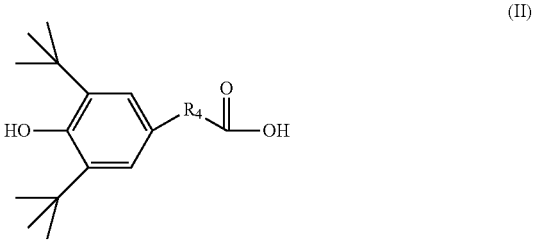

wherein $R_4$ is selected from a $C_1$-$C_{10}$ alkyl group, preferably a $C_1$-$C_4$ alkyl group.

[2]. The semi-aromatic polyamide according to [1], wherein the metal cation is $Na^+$ or $K^+$.

[3]. The semi-aromatic polyamide according to [1] or [2], wherein a total phosphorus content in per unit mass of the semi-aromatic polyamide resin is not greater than 200 ppm, preferably not greater than 150 ppm, and more preferably not greater than 90 ppm.

[4]. The semi-aromatic polyamide according to any one of [1] to [3], wherein a molar ratio between the compounds represented by formula (I-1) and formula (I-2) is from 10:0 to 2:8, preferably from 10:0 to 5:5.

[5]. The semi-aromatic polyamide according to any one of [1] to [4], wherein a molar content of a structure derived from the formula (II) is from 0.1 to 2.0%, preferably from 0.3 to 1.5% of a molar content of a structure derived from the dibasic acid.

[6]. The semi-aromatic polyamide according to any one of [1] to [5], wherein a mole number of a structure derived from the monoacid is from 1 to 5%, preferably from 2 to 3% with respect to a total mole number of a structure derived from the dibasic acid.

[7]. The semi-aromatic polyamide according to any one of [1] to [6], wherein the dibasic acid includes an aromatic dibasic acid and optionally one or more aliphatic dibasic acids, and a molar ratio between the aromatic dibasic acid and the aliphatic dibasic acid is from 100:0 to 50:50, preferably from 80:20 to 55:45.

[8]. The semi-aromatic polyamide according to any one of [1] to [7], wherein the semi-aromatic polyamide resin has active end groups and the concentrations of the active end groups satisfy: $[NH_2]/[COOH]>5$, and in the semi-aromatic polyamide resin, $[COOH]$ has a concentration of not higher than 20 mmol/kg, preferably not higher than 10 mmol/kg.

[9]. The semi-aromatic polyamide according to any one of [1] to [8], wherein the semi-aromatic polyamide has a thermal stability index $MV_{30}/MV_6$ of greater than 95%, a yellowness index of less than 20, a glass transition temperature of 90° C. or above, and a melting point of 300° C. or above.

[10]. Furthermore, the present disclosure also provides a method for preparing a semi-aromatic polyamide, wherein in the method, a diamine, a dibasic acid and a monoacid are used as main raw materials and are subjected to polymerization in the presence of end-capping agents that are as represented by the structures of the following formula (I) and formula (II),
wherein the formula (I) is selected from compounds represented by the following formula (I-1) and/or formula (I-2):

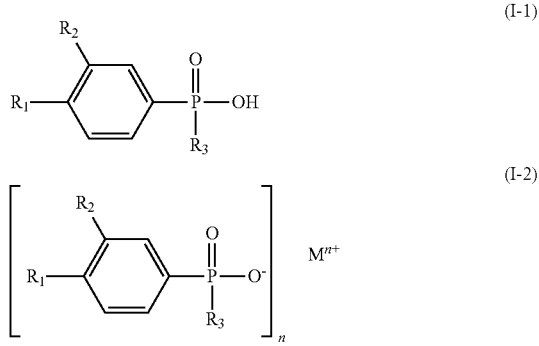

wherein $R_1$ is a carboxyl group, or a carboxyl-substituted $C_1$-$C_{10}$ alkyl group, preferably a carboxyl-substituted $C_1$-$C_4$ alkyl group; $R_2$ is a $C_1$-$C_4$ alkyl group or H, preferably H; $R_3$ is selected from a $C_6$-$C_9$ aryl group or H, preferably a $C_6$-$C_8$ aryl group; and $M^{n+}$ is selected from +1- and +2-valent metal cations;
the formula (II) is:

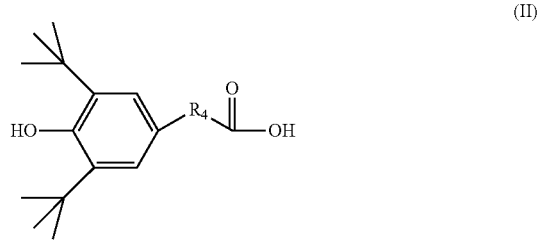

wherein $R_4$ is selected from a $C_1$-$C_{10}$ alkyl group, preferably a $C_1$-$C_4$ alkyl group.

[11]. The method according to [10], comprising:
a salt forming reaction: subjecting an initial charge of the diamine and the dibasic acid in an amine/acid molar ratio of less than 1 to form a salt solution together with water;
a pre-polymerization reaction: adjusting the amine/acid molar ratio in a reaction system to be larger than 1.03 with the diamine, the monoacid and the end-capping agents and performing a pre-polymerization reaction to obtain a pre-polymerization reaction solution; and
a polycondensation reaction: subjecting the pre-polymerization reaction solution to a polycondensation reaction.

[12]. The method according to [11], wherein in the salt forming reaction, the amine/acid molar ratio of the initial charge is from 0.90 to 0.99, preferably from 0.92 to 0.98.

[13]. The method according to [11] or [12], wherein the salt forming reaction further comprises detecting a composition of the dibasic acid in the salt solution and keeping the composition/content of the dibasic acid stable by adding an aromatic dibasic acid and/or an aliphatic dibasic acid; and the pre-polymerization reaction further comprises detecting a composition of a pre-polymerization reaction system, and detections are all conducted by online Raman spectroscopy.

[14]. The method according to any one of [11] to [13], wherein the amine/acid molar ratio in the pre-polymerization reaction is from 1.03 to 1.07, preferably from 1.04 to 1.06.

[15]. The method according to any one of [11] to [14], further comprising subjecting the salt solution to dehydration prior to the pre-polymerization reaction, wherein the dehydration is conducted at a temperature ranging from 180 to 240° C. and under a pressure ranging from 0.8 to 1.5 MPa, and the dehydration lasts for 10 to 30 min; the pre-polymerization reaction is conducted at a temperature ranging from 280 to 350° C. and tinder a pressure ranging from 15 to 30 MPa, and the pre-polymerization reaction lasts for 1 to 15 min; the polycondensation reaction is conducted at a reaction temperature ranging from 290 to 350° C., and the polycondensation reaction lasts for 0.5 to 7 min.

[16]. The method according to [15], wherein steam generated from the dehydration may be used as a heat source for heating and dissolution of ae slurry, and excessive steam may be combined after condensation with condensed water generated from a heating process and used as supplementary water for use in a process of forming the slurry.

[17]. Furthermore, the present disclosure also provides a resin composition, comprising:
the semi-aromatic polyamide according to any one of [1] to [9], or a semi-aromatic polyamide obtained by the method according to any one of [10] to [16], and optionally other resins, reinforcing components, or additives.

[18]. In addition, the present disclosure further provides an article prepared from the composition according to [17].

[19]. The article according to [18], which is an automobile part or a part for use in electrical industry.

[20]. The article according to [18], which is a spare part for a fuel pipeline in an automobile, or a LED panel.

Advantageous Effects of the Disclosure

The semi-aromatic polyamide resin according to the present disclosure contains specific end-capping agents or is prepared therefrom. The end-capping agents include a reactive group-containing condensation catalyst represented by formula (I) and a reactive group-containing hindered phenolic antioxidant represented by formula (II). Not only can the aforesaid catalyst participate in the polymerization reaction process and increase the polymerization reaction rate, but the catalyst itself is capable of undergoing an in-situ end capping reaction with an amine end group, and upon completion of the reaction, it becomes a low-valent phosphine-containing end group of the polymer, which has a certain antioxidative effect. Next, the reactive group-containing hindered phenolic antioxidant is also capable of undergoing an in-situ end capping reaction with an amine end group, so that the antioxidant can be uniformly distributed and fixed in the polymer to avoid the phenomenon that the antioxidant becomes ineffective due to its migration to the surface when heated. As a result, the special end-capping agents of the present disclosure are capable of maintaining the long-term thermal stability of the polymer.

In addition, by controlling the content of the carboxyl functional group of the polymer, the present disclosure may effectively control the reaction of the polymer with an amine end group when heated, thereby improving the stability of viscosity and molecular weight of the polymer upon heating.

DESCRIPTION OF REFERENCE NUMERALS

Figure 1:
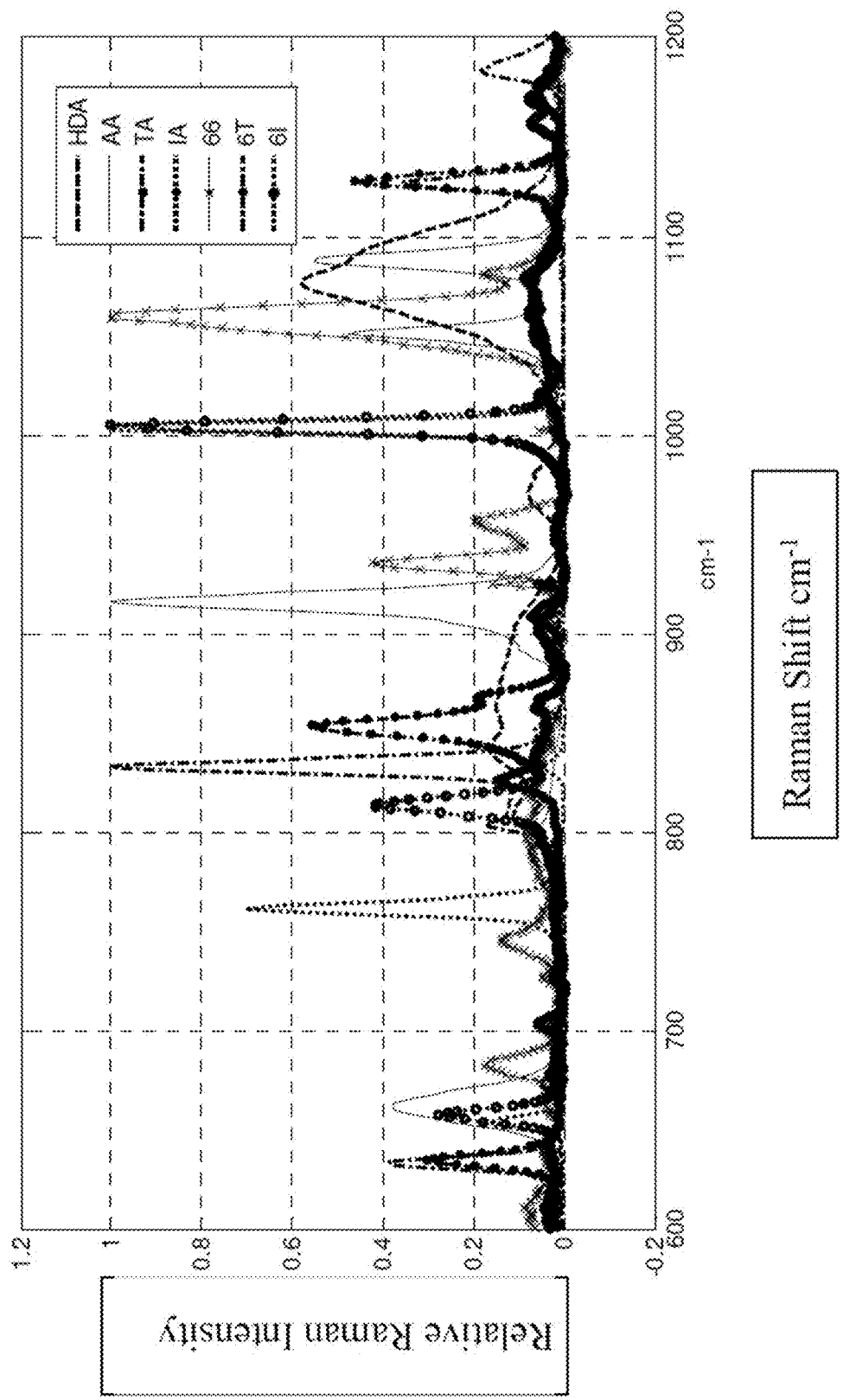
FIG. 1 shows normalized Raman spectrums (600-1200 cm$^{-1}$) of various nylon salts.

1: Stock bin of aliphatic dibasic acid
2, 4, 6: Feed screw conveyor
3: Stock bin of terephthalic acid
5: Stock bin of isophthalic acid (or other dibasic acids)
7: Storage tank of the aqueous solution of catalyst(s)
8, 10, 12, 13, 17, 23, 24, 26, 28, 30, 32: Pump
9: Pulping kettle
11: Storage tank of molten diamine
14: Multi-stage stirring and dissolving kettle
15, 27, 33, 44, 49: Heat exchanger
16, 18, 20: Online Raman spectroscopic detector
19: Dissolving and salt-forming kettle
21: Controller
22: Storage tank of molten aliphatic dibasic acid
25: Storage tank of the slurry of isophthalic acid (or other dibasic acids)
29, 46: Dehydrater
31: Storage tank of molten monoacid
34, 50: Pre-polymerization reactor
35, 37, 51, 53: Reducing valve
36, 52: Flash vaporizer
38, 54: Polycondensation reactor (double-screw extruder)
39, 55: Pelletizer
40, 56: Drier
41, 42: Salt-forming kettle
43: Delivery pump of salt solution
45: Circulating pump
47: Condenser
48: Feed pump for the dehydrated material

DETAILED DESCRIPTION

The polyamide of the present disclosure, the preparation method therefor and use thereof will be described in detail below. It should be noted that, unless otherwise stated, all of the names of units used herein are the names of universal international units in this field. In addition, point values or numerical ranges of the numerical values recited hereinafter should all be construed as including industrially allowable errors.

<First Aspect of the Present Disclosure>

According to the first aspect of the present disclosure, there is provided a semi-aromatic polyamide, which is obtained by polymerizing a diamine, a dibasic acid and a monoacid (as main raw materials) with end-capping agents. That is, in addition to end-capped structures, the semi-aromatic polyamide of the present disclosure substantially contains structural units derived from the above-mentioned diamine, dibasic acid, and monoacid.

Diamine/Dibasic Acid/Monoacid

Said diamine is not particularly limited, and may be selected from diamines generally used in this field to prepare polyamide. For example, a diamine suitable for the present disclosure may be an aliphatic or aromatic diamine having 4 to 15 carbon atoms. In some preferred embodiments of the present disclosure, such diamine may be one or more selected from butanediamine, pentanediamine, hexamethylenediamine, heptamethylenediamine, octamethylenediamine, nonamethylenediamine, decamethylenediamine, 2-methylpentamethylenediamine, undecamethylenediamine, dodecamethylenediamine, and xylylenediamine. From the standpoint of synthetic efficiency, the diamine of the present disclosure is preferably hexamethylenediamine or decamethylenediamine.

Said dibasic acid includes one or more aromatic dibasic acids, and optionally includes one or more aliphatic dibasic acids. The aromatic dibasic acids and the aliphatic dibasic acids are not particularly limited, and conventional dibasic acids in this field may be used. In some preferred embodiments of the present disclosure, said aromatic dibasic acid is selected from aromatic dibasic acids having 8 to 20 carbon atoms, and is preferably one or more selected from isophthalic acid, terephthalic acid and naphthalene dicarboxylic acid, and more preferably any one of isophthalic acid and terephthalic acid, or any mixture thereof. In some preferred embodiments of the present disclosure, the aliphatic dibasic acid is selected from aliphatic dibasic acids having 4 to 15 carbon atoms, for example, one or more selected from succinic acid, glutaric acid, adipic acid, suberic acid, azelaic acid, sebacic acid, and dodecanedioic acid, and more preferably adipic acid. In the present disclosure, the aromatic dibasic acid is an essential component, and whenever necessary, the above-mentioned aliphatic dibasic acid(s) may be used.

In some preferred embodiments of the present disclosure, the molar ratio between the aromatic dibasic acid and the aliphatic dibasic acid is from 100:0 to 50:50, preferably from 80:20 to 55:45.

Said monoacid is also not particularly limited, and may be selected from monoacids generally used in this field to prepare polyamide. The monoacid is selected from monoacids having 2 to 30 carbon atoms, and may be an aliphatic monoacid and/or an aromatic monoacid, preferably one or more selected from acetic acid, propionic acid, butyric acid, valeric acid, caproic acid, octanoic acid, capric acid, lauric acid, palm acid, palmitic acid, stearic acid, benzoic acid, or phenylacetic acid, and further preferably acetic acid or benzoic acid.

In the present disclosure, the amounts of various acids may be adjusted. In some preferred embodiments of the present disclosure, the mole number of the monoacid is from 1 to 5%, preferably from 2 to 3% with respect to the total mole number of the dibasic acid from the perspective of improving the thermal stability of polyamides.

End-Capping Agent

The end-capping agents used in the present disclosure are capable of forming end-capped structures at the ends of the polyamide molecule during the polycondensation reaction.

In the present disclosure, the end-capping agents include a reactive group-containing catalyst for polycondensation reaction represented by formula (I), and a reactive group-containing hindered phenolic antioxidant represented by formula (II).

Said reactive group-containing catalyst for polycondensation reaction represented by formula (I) consists of compound(s) represented by the following formula (I-1) and/or formula (I-2):

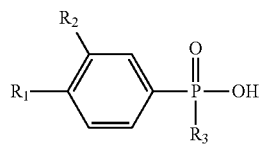

(I-1)

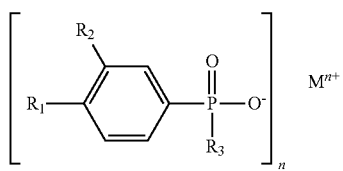

(I-2)

wherein $R_1$ is a carboxyl group or a carboxyl-substituted $C_1$-$C_{10}$ alkyl group, including a carboxyl group or a carboxyl-substituted $C_5$-$C_{10}$ cycloalkyl group, preferably a carboxyl-substituted $C_1$-$C_4$ alkyl group; $R_2$ is a $C_1$-$C_4$ alkyl group or H, preferably H; $R_3$ is selected from a $C_6$-$C_9$ aryl group or H, preferably a $C_6$-$C_8$ aryl group; and $M^{n+}$ is selected from +1- and +2-valent metal cations, preferably $Na^+$ or $K^+$.

One or both of the compounds represented by the above-mentioned formula (I-1) and formula (I-2) may be used. In a preferred embodiment of the present disclosure, the compound of the above-mentioned formula (I-1) is an essential component. In a further preferred embodiment of the present disclosure, the molar ratio between the compounds represented by formula (I-1) and formula (I-2) is from 10:0 to 2:8, more preferably from 10:0 to 5:5.

The molar ratio between the compounds represented by formula (I-1) and formula (I-2) is from 10:0 to 2:8, preferably from 10:0 to 5:5.

The amount of a compound having the structure of formula (I) meets the requirement that the total phosphorus content in per unit mass of the semi-aromatic polyamide resin is not greater than 200 ppm, preferably not greater than 150 ppm, more preferably not greater than 90 ppm.

The structure of said reactive group-containing hindered phenolic antioxidant represented by formula (II) is as shown below:

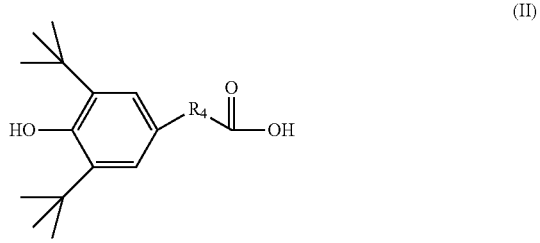

(II)

wherein $R_4$ is selected from a $C_1$-$C_{10}$ alkyl group including a $C_5$-$C_{10}$ cycloalkyl group, preferably a $C_1$-$C_4$ alkyl group.

The molar content of said reactive group-containing hindered phenolic antioxidant represented by formula (II) is from 0.1 to 2.0%, preferably from 0.3 to 1.5% of the molar content of the dibasic acid.

Other Ingredients

Without impacting the effects of the present disclosure, catalysts, various polycondensation aids, functional ingredients, or molecular weight regulators, or the like may also be used in addition to the components disclosed above.

Other usable catalysts may be exemplified by phosphorus-based compounds other than those of the above-mentioned formula (I), including phosphoric acid, phosphorous acid, hypophosphorous acid, and salt derivatives or ester derivatives thereof, such as phosphoric acid, phosphorous acid or hypophosphorous acid, or the sodium, potassium, magnesium, vanadium, calcium, zinc, cobalt, manganese, tin, tungsten, germanium, titanium or antimony salts of phosphoric acid, phosphorous acid or hypophosphorous acid; ammonium phosphate, ammonium phosphite and ammonium hypophosphate; the ethyl ester, isopropyl ester, butyl ester, hexyl ester, isodecyl ester, octadecyl ester, decyl ester, octadecanoyl ester or phenyl ester of phosphoric acid, phosphorous acid, or hypophosphorous acid, etc. In a preferred embodiment, as for the catalyst, it is preferred to merely use the catalyst represented by the above-mentioned formula (I) of the present disclosure.

Physical Properties of Polymer

The semi-aromatic polyamide of the present disclosure is a polymer having active end groups which is obtained after the polycondensation reaction. In some preferred embodiments, the concentrations of the active end groups satisfy: $[NH_2]/[COOH]>5$, and in the semi-aromatic polyamide resin, [COOH] has a concentration of not higher than 20 mmol/kg, preferably not higher than 10 mmol/kg.

In addition, the semi-aromatic polyamide according to the present disclosure has improved thermal stability, excellent yellowing resistance, and high glass transition temperature and melting point, in comparison to the prior art. In some preferred embodiments of the present disclosure, the semi-aromatic polyamide according to the present disclosure has a thermal stability index $MV_{30}/MV_6$ of greater than 95%, preferably greater than 96%; a yellowness index of less than 20, preferably less than 19; a glass transition temperature of 90° C. or above, preferably above 95° C.; and a melting point of 300° C. or above.

<Second Aspect>

According to the second aspect of the present disclosure, there is also provided a method for preparing a semi-aromatic polyamide.

A second object of the present disclosure is to provide a method for preparing the above-mentioned thermally stable semi-aromatic polyamide, which may be any method existing in the prior art that is capable of implementing the technical solutions of the present disclosure, for example, a melting method, a solution method, a solid state method, etc.

Preferably, the semi-aromatic polyamide is formed by subjecting a diamine, a dibasic acid and a monoacid (as main raw materials) and the above-mentioned special end-capping agents to pre-polymerization and polycondensation. More preferably, the semi-aromatic polyamide is formed by subjecting a diamine, a dibasic acid and a monoacid (as main raw materials) and special end-capping agents to salt forming reaction, pre-polymerization reaction, and polycondensation reaction, wherein said polycondensation is melt polycondensation or solid phase polycondensation, preferably melt polycondensation.

The monoacid and the special end-capping agents are added at the stage of salt forming reaction, pre-polymerization reaction or polycondensation reaction, and are preferably added at the stage of pre-polymerization reaction.

More specifically, in the method according to the present disclosure, a diamine, a dibasic acid and a monoacid are used as main raw materials, and are polymerized in the presence of end-capping agents. The end-capping agents are compounds represented by the structures of formula (I) and formula (II).

The structures and types of the above-mentioned diamine, dibasic acid, monoacid, and end-capping agents are the same as those described in the above first aspect of the present disclosure.

In a preferred embodiment of the present disclosure, the method for preparing the semi-aromatic polyamide specifically comprises the following reactions, procedures, or steps:
  a salt forming reaction: subjecting an initial charge of the diamine and the dibasic acid in an amine/acid molar ratio of less than 1 to form a salt solution together with water;
  a pre-polymerization reaction: adjusting the amine/acid molar ratio in a reaction system to be larger than 1.03 with the diamine, the monoacid and the end-capping agents and performing the pre-polymerization reaction to obtain a pre-polymerization reaction solution; and
  a polycondensation reaction: subjecting the pre-polymerization reaction solution to the polycondensation reaction.

In a further preferred embodiment of the present disclosure, the method for preparing the semi-aromatic polyamide may specifically comprises:
  a salt forming reaction (Step 1): subjecting an initial charge of the diamine and the dibasic acid in an amine/acid molar ratio of less than 1 to form a slurry together with water, and subjecting the slurry to heating and dissolution to form a salt solution, wherein the amine/acid molar ratio in the initial charge is preferably from 0.90 to 0.99, more preferably from 0.92 to 0.98.
  a pre-polymerization reaction (Step 2): dehydrating the salt solution after detecting the composition thereof, detecting the content of diamine in the steam condensate from a dehydration device, adjusting the amine/acid molar ratio to be larger than 1.03 with a diamine, a monoacid as a molecular weight regulator, and end-capping agents, and performing the pre-polymerization reaction; and
  a polycondensation reaction (Step 3): subjecting the pre-polymerization reaction solution to polycondensation reaction after vacuum flashing.

In a preferred embodiment of the present disclosure, said Step 1 further comprises a step of detecting the composition of the dibasic acid in the salt solution and keeping the composition of the dibasic acid stable by adding an aromatic dibasic acid and/or an aliphatic dibasic acid. For instance, online Raman spectroscopy is adopted to detect and obtain the composition of the dibasic acid in the salt solution, and the composition of the dibasic acid in the salt solution is adjusted by the slurry of an aliphatic dibasic acid and/or an aromatic dibasic acid according to the detection results to keep the composition stable.

In a preferred embodiment of the present disclosure, the amine/acid molar ratio in the salt solution prior to dehydration and the content of the diamine in the steam condensate generated from the dehydration device are detected by online Raman spectroscopy, and the amine/acid molar ratio is adjusted, according to the detection results, to be greater than 1.03 with the diamine, the monoacid as the molecular weight regulator and the above-mentioned end-capping agents. Adjusting the amine/acid molar ratio to be greater than 1.03 with the diamine, the monoacid as the molecular weight regulator and the above-mentioned end-capping agents as described above means that the adjusted amine/acid molar ratio of the aliphatic diamine to the sum of the aliphatic dibasic acid, the aromatic dibasic acid, the monoacid as the molecular weight regulator, and the end-capping agents is controlled to be greater than 1.03, preferably from 1.035 to 1.07, and more preferably from 1.04 to 1.06.

In a specific embodiment of the present disclosure, the production method of the W semi-aromatic polyamide is a continuous production method. For instance, online Raman spectroscopy is adopted to detect and obtain the composition of the dibasic acid in the salt solution, and the composition of the dibasic acid in the salt solution is adjusted by the slurry of an aliphatic dibasic acid and/or an aromatic dibasic acid according to the detection results to keep the composition stable. Besides, the amine/acid molar ratio in the material prior to dehydration and the content of the diamine in the steam condensate generated from the dehydration device are detected by online Raman spectroscopy, and the amine/acid molar ratio is adjusted, according to the detection results, to be greater than 1.03 with the diamine, the monoacid as the molecular weight regulator, and the end-capping agents.

In addition, in the pre-polymerization reaction, the steam generated from the dehydration stage may be used as the heat source for the heating and dissolution process of the slurry in the salt forming reaction (Step 1), and the excessive steam may be combined after condensation with the condensed water generated from the heating process and used as supplementary water for use in the process of forming the slurry.

In a preferred embodiment of the present disclosure, when the slurry in the salt forming reaction is formed, the moisture content of the system may be from 10 to 50%, preferably from 15 to 30%, and the temperature may be from 50 to 95° C., preferably from 60 to 90° C. The temperature of dissolution and forming a salt may be from 120 to 170° C., preferably from 130 to 160° C. In the dehydration process, the dehydration temperature may be from 180 to 240° C.; the pressure may be from 0.8 to 1.5 MPa; the dehydration may last for 10 to 30 min, preferably from 15 to 30 min; and the moisture content after dehydration is from 5 to 20%, preferably from 7 to 15%.

In a preferred embodiment of the present disclosure, the pre-polymerization may be conducted at a reaction temperature ranging from 280 to 350° C., preferably from 280 to 340° C.; the pressure may be from 15 to 30 MPa, preferably from 15 to 25 MPa; the reaction time may be from 1 to 15 min, preferably from 2 to 10 min. After the pre-polymerization reaction, the pressure of vacuum flashing may be from 0.15 to 0.9 MPa, preferably from 0.2 to 0.6 MPa, and the temperature may be the same as that of the pre-polymerization reaction. After the vacuum flashing, the prepolymer enters a double-screw extruder as a melt and is subjected to polycondensation reaction, the reaction temperature may be from 290 to 350° C., preferably from 310 to 340° C.; and the reaction time may be from 0.5 to 7 min, preferably from 1 to 6 min.

In addition, there is no particular limitation on the device for implementing the above-mentioned method of the present disclosure. Various apparatuses and auxiliary facilities available in this field may be used to implement the above-mentioned production method. For example, in some embodiments of the present disclosure, the flow chart or device as shown, e.g., in FIG. 3 or FIG. 4 may be used.

<Third Aspect>

In a third aspect of the present disclosure, there are provided a resin composition, an article thereof, and use of the article.

The resin composition of the present disclosure comprises a semi-aromatic polyamide according to the first aspect of the present disclosure, or a semi-aromatic polyamide obtained by the preparation method according to the second aspect of the present disclosure. Besides, the composition of the present disclosure may further comprise optionally other resins, reinforcing components, additives, or the like as needed without restriction.

Other resins may be thermoplastic resins or thermosetting resins, for example, polyester resins, epoxy resins, polyacrylic resins, olefin-based elastomers, etc. In particular, with regard to a resin composition comprising a polyamide resin as a matrix, additional ingredients may be used to improve the toughness of the polyamide resin. These ingredients may be the elastomers as described above, such as copolymers based on ethylene and/or diolefins, etc. In addition, in some cases, these elastomers may be modified by substituents with polar groups. Typically, these substituents may be derived from anhydride monomers, e.g., maleic anhydride, etc.

As for the reinforcing components, the resin composition of the present disclosure may be reinforced with a fiber or an inorganic filler. Said fiber may be a resin fiber, a carbon fiber, an inorganic fiber, a mineral fiber, etc., and said inorganic filler may be silica, titanium dioxide, montmorillonite, etc. Also, the surfaces of the inorganic ingredients in these components described above are preferably treated with a compatibilizer to enhance the compatibility with the polyamide matrix.

As for other additives and the like, various processing aids, antioxidants, antistatic agents, ultraviolet absorbers, lubricants, and the like in the field may be used without restriction.

The mixing method for the resin composition of the present disclosure is not particularly limited. Various components may be melted and mixed, or may be blended using an internal mixer or an open mill, or may be directly blended and extruded using an extruder.

Moreover, in the case where there is a fiber reinforcing ingredient in the composition, the composition may be obtained by an impregnation method with the aid of a solvent, and said impregnation method may be a conventional method in this field.

Furthermore, the present disclosure further provides articles based on the above-mentioned compositions, and these articles may be obtained by injection molding, extrusion, impregnation, or other methods. Preferably, these articles may be parts in automobiles or parts in the electrical industry. Specifically, these articles may be parts for fuel pipelines in automobiles, or LED panels.

EXAMPLES

In order to enable a person skilled in the art to have a better understanding of the technical solutions of the present disclosure, the present disclosure will be further described below with reference to the following Examples. However, it should be understood that the Examples are merely specific embodiments of the present disclosure and should not be construed as limitations to the present disclosure. The percentages in the Examples are mass percentages if not particularly specified.

The properties in the Examples and Comparative examples are all measured in accordance with the following methods.

1. Intrinsic Viscosity

A sample was dissolved in a mixed solvent of phenol-tetrachloroethane (with a mass ratio of 3:2) to obtain solutions respectively having a concentration of 0.1, 0.5 and 1.0 g/dL, and the inherent viscosity $\eta_{in}$ of the sample was measured with a Ubbelohde viscometer in a thermostatic water bath at 30° C.

$$\eta_{in}=[\ln(t/t_0)]/C(dL/g)$$

wherein $t_0$ was the duration (s) of the flow of the solvent, t was the duration (s) of the flow of the solution, and C was the concentration (g/dL) of the sample solution.

The data of $\eta_{in}$ was extrapolated to the concentration of 0 g/dL, and the intrinsic viscosity [η] of the sample was thus obtained.

2. Thermal Stability Characterization

The thermal stability mentioned in the present disclosure was expressed as the retention of melt viscosity. The higher the retention of melt viscosity, the better the thermal stability of the resin; on the contrary, the lower the retention of melt viscosity, the poorer the thermal stability of the resin.

(1) Retention of Melt Viscosity

The test for melt viscosity was carried out on Dynisco's LCR-7000 capillary rheometer. The mouth die was a CZ394-20 mouth die. The shear rate was 1000 $s^{-1}$. The test temperature was $(T_m+15)°$ C. The melt viscosity after a melting period of 6 min and 30 min were respectively tested and recorded as $MV_6$ and $MV_{30}$, and the retention of melt viscosity was $MV_{30}/MV_6$.

(2) Yellowing Test

The yellowness index YI was the yellow value of a polymer material measured when the light source was subject to the standard of the International Commission on Illumination and magnesium oxide was used as a reference. The specific test method was as follows. A yellowness index testing instrument was used to determine the yellowness indices of samples after being stored at different temperatures for 24 hours and the yellowness indices after being stored at 60° C. for different time periods. The yellowing index was calculated by the following equation:

$$YI=100(1.28X-1.06Z)/Y$$

where X, Y and Z were the measured tristimulus values, respectively.

3. Melting Point Test

The melting point was tested in accordance with HG/T2235-1991(2012). The test was conducted by heating the sample to 330° C. at a heating rate of 10° C./min within a temperature range from 20 to 330° C., keeping for 5 min, and then cooling the sample at a cooling rate of 20° C./min. The peak temperature of the endothermic peak during heating served as the melting point.

4. Test for Concentration of Active Terminal Amine Group

The content of the terminal amine group of the sample was titrated by using an automatic potentiometric titrator. 0.5 g of the polymer was weighed, to which 45 ml of phenol and 3 ml of absolute methanol were added, and the resultant was heated to reflux. After the sample was observed to be completely dissolved, the mixture was cooled to room temperature. The content of the terminal amine group was titrated with a calibrated 0.1N hydrochloric acid standard solution.

5. Content of Active Terminal Carboxyl Group

The content of the terminal carboxyl group of the sample was titrated by using an automatic potentiometric titrator. 0.5 g of the polymer was weighed, to which 50 ml of o-cresol was added, and the resultant was heated to dissolution. After cooling, 400 μL of formaldehyde solution was added rapidly. The content of the terminal carboxyl group was titrated with a calibrated KOH-ethanol solution.

6. Raman Spectrum

Figure 2:
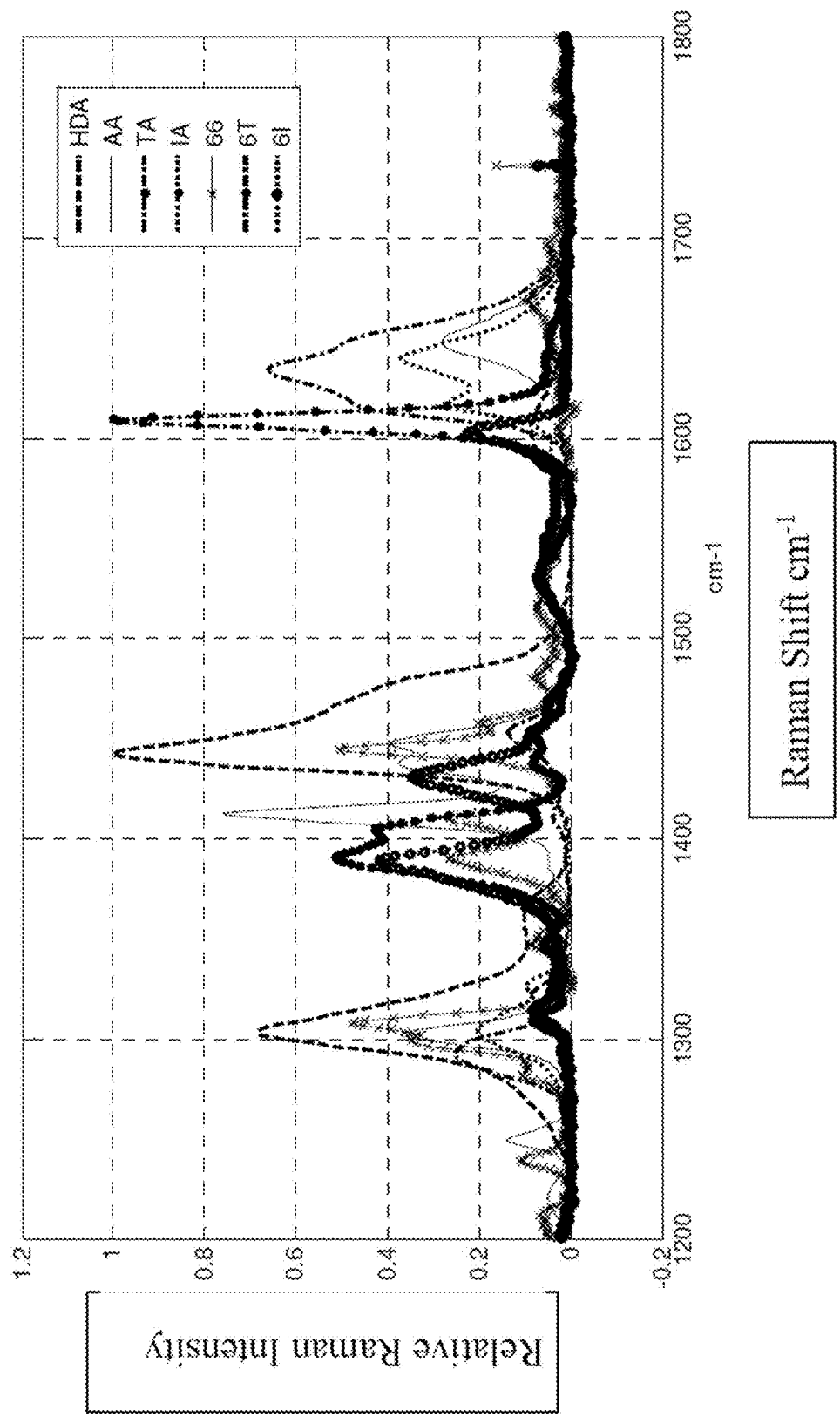
FIG. 2 shows normalized Raman spectrums (1200-1800 cm$^{-1}$) of various nylon salts.

By the analysis and study of the Raman spectra (see FIGS. 1 and 2) of terephthalic acid (TA), isophthalic acid (IA), adipic acid (AA) and hexamethylenediamine (HDA) that had been mixed to form salts, the following Raman spectral information was used to determine the content of each component in the present disclosure.

(1) The contents of isophthalic acid (IA) and a salt thereof (6I) were determined by the characteristic peaks at 1005 $cm^{-1}$ and 762 $cm^{-1}$.

(2) The contents of terephthalic acid (TA) and a salt thereof (6T) were determined by the characteristic peaks at 1128 $cm^{-1}$ and 854 $cm^{-1}$.

(3) The contents of adipic acid (AA) and a salt thereof (66) were determined by the characteristic peaks at 920 $cm^{-1}$ and 936 $cm^{-1}$.

(4) The content of hexamethylenediamine (HDA) was determined by the characteristic peak at 1485 $cm^{-1}$.

Figure 3:
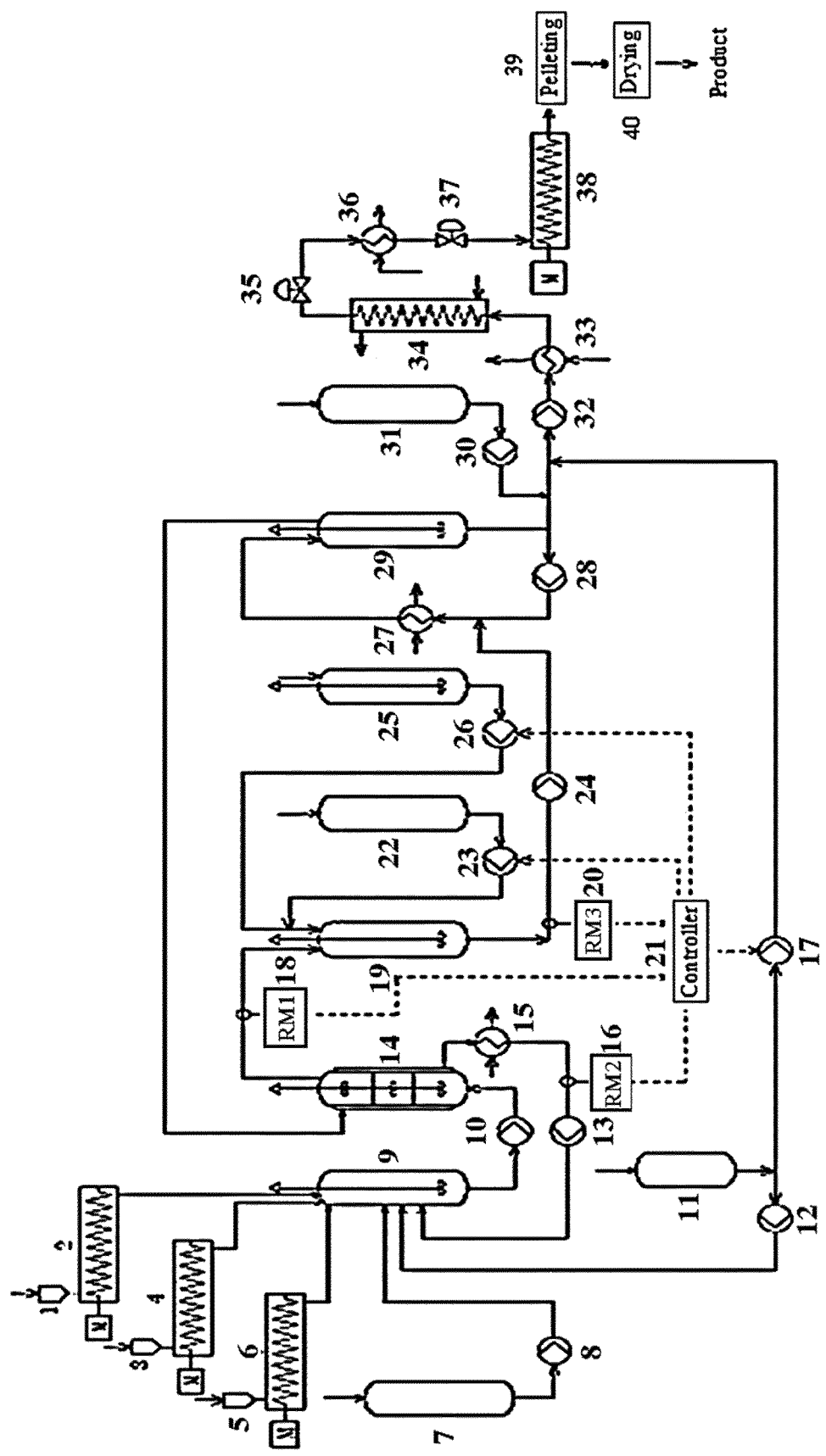
FIG. 3 shows a flow chart of preparing the polyamide of the present disclosure.
Figure 4:
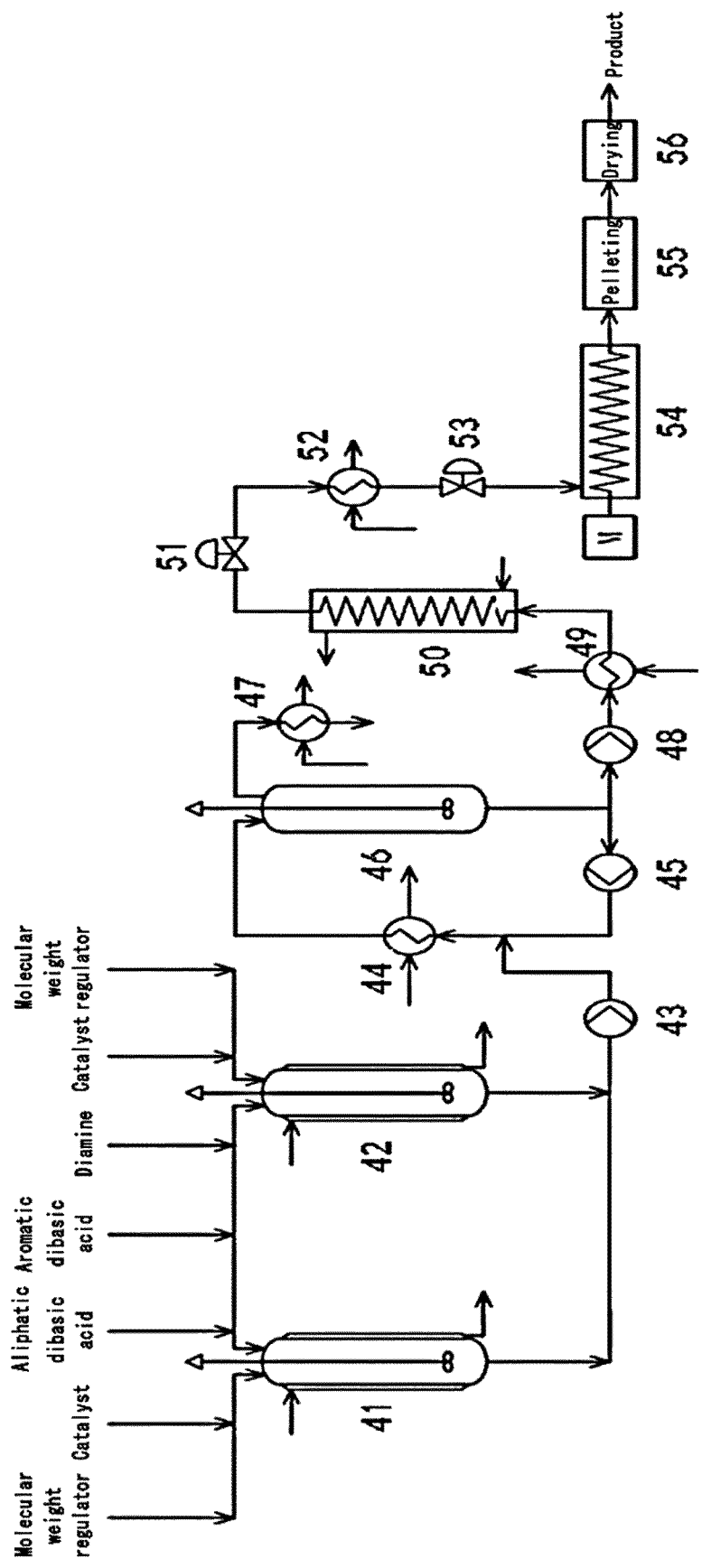
FIG. 4 shows another flow chart of preparing the polyamide of the present disclosure.

Examples 1 to 4 and Comparative Examples 1 to 4 were all carried out according to the flow chart of FIG. 3; the pre-polymerization process in Example 5 was carried out according to the flow chart of FIG. 3, and the polycondensation was solid phase polycondensation; and Example 6 was carried out according to the flow chart of FIG. 4. In the preparation process, all materials were deoxidized with high-purity nitrogen gas, and all devices used in the preparation process were purged with and protected by high-purity nitrogen gas.

Example 1

In an amine/acid molar ratio of 0.92 in the initial charge, 4.66 Kg/h (27.5 mol/h) of terephthalic acid. 3.29 Kg/h (22.5 mol/h) of adipic acid, 5.34 Kg/h (46.0 mol/h) of hexamethylenediamine, and 3.2 Kg/h of water were fed together into a pulping kettle 9 and continuously pulped at 70° C. to form a slurry. The slurry was conveyed to a multi-stage stirring and dissolving kettle 14 via a pump 10, and heated to 160° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.0 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 180° C., the moisture content was controlled at 13%, and the residence time for dehydration was 30 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine, 0.06 Kg/h (1.0 mol/h) of acetic acid as the molecular weight regulator, 0.153 Kg/h (0.5 mol/h) of 3-(3,5-di-tert-butyl-4-hydroxyphenyl)valeric acid, 0.0114 Kg/h (90 ppm P) of P-(4-carboxybutylphenyl)phosphinic acid and P-phenyl-phosphinic acid were used to adjust the amine/acid molar ratio to 1.04. Thereafter, the material was pressurized to 15 MPa by a pump 32, conveyed to a preheater (heat exchanger) 33 for preheating to a temperature of 290° C., and held and reacted at 290° C. for 15 min in a pre-polymerization reactor 34; and after being depressurized to 0.3 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 290 to 320° C. and the residence time for reaction was 6 min. The material obtained after polycondensation reaction was pelleted in an underwater pelletizer 39 and then dried by a drier 40 to obtain a semi-aromatic polyamide product at about 12.4 Kg/h.

Example 2

In an amine/acid molar ratio of 0.98 in the initial charge, 4.98 Kg/h (30 mol/h) of terephthalic acid. 1.66 Kg/h (10 mol/h) of isophthalic acid, 1.46 Kg/h (10 mol/h) of adipic acid, 8.43 Kg/h (49.0 mol/h) of decamethylenediamine, and 5.0 Kg/h of water were fed together into a pulping kettle 9 and continuously pulped at 90° C. to form a slurry. The slurry was conveyed to a multi-stage stirring and dissolving kettle 14 via a pump 10, and heated to 170° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.5 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 240° C. the moisture content was controlled at 10%, and the residence time for dehydration was 10 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten decamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten decamethylenediamine, 0.122 Kg/h (1.0 mol/h) of benzoic acid as the molecular weight regulator, 0.0393 Kg/h (0.15 mol/h) of 2-(3,5-di-tert-butyl-4-hydroxyphenyl)acetic acid, 0.0079 Kg/h (70 ppm P) of P-(4-carboxyethylphenyl)phosphinic acid and P-(4-methylphenyl)phosphinic acid were used to adjust the amine/acid molar ratio to 1.06. Thereafter, the material was pressurized to 30 MPa by a pump 32, conveyed to a preheater (heat exchanger) 33 for preheating to a temperature of 350° C., and held and reacted at 350° C. for 1 min in a pre-polymerization reactor 34; and after being depressurized to 0.5 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 320 to 330° C. and the residence time for reaction was 1 min. The material obtained after polycondensation reaction was pelleted in an underwater pelletizer 39 and then dried by a drier 40 to obtain a semi-aromatic polyamide product at about 15.4 Kg/h.

Example 3

In an amine/acid molar ratio of 0.96 in the initial charge, 4.98 Kg/h (30 mol/h) of terephthalic acid, 2.92 Kg/h (20 mol/h) of adipic acid, 5.57 Kg/h (48.0 mol/h) of hexamethylenediamine, and 4.0 Kg/h of water were fed together into a pulping kettle 9 and continuously pulped at 80° C. to form a slurry. The slurry was conveyed to a multi-stage stirring and dissolving kettle 14 via a pump 10, and heated to 165° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.3 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 220° C., the moisture content was controlled at 12%, and the residence time for dehydration was 20 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine. 0.09 Kg/h (1.5 mol/h) of acetic acid as the molecular weight regulator, 0.0725 Kg/h (0.25 mol/h) of 2-(3,5-di-tert-butyl-4-hydroxyphenyl)butyric acid, 0.0063 Kg/h (50 ppm P) of P-(4-carboxybutylphenyl)phosphinic acid and P-(3,4-dimethylphenyl)phosphinic acid were used to adjust the amine/acid molar ratio to 1.05. Thereafter, the material was pressurized to 25 MPa by a pump 32, conveyed to a preheater (heat exchanger) 33 for preheating to a temperature of 320° C., and held and reacted at 320° C. for 3 min in a pre-polymerization reactor 34; and after being depressurized to 0.4 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 310 to 320° C. and the residence time for reaction was 3 min. The material obtained after polycondensation reaction was pelleted in an underwater pelletizer 39 and then dried by a drier 40 to obtain a semi-aromatic polyamide product at about 12.2 Kg/h.

Example 4

In an amine/acid molar ratio of 0.94 in the initial charge, 4.66 Kg/h (27.5 mol/h) of terephthalic acid. 3.29 Kg/h (22.5 mol/h) of adipic acid, 5.45 Kg/h (47.0 mol/h) of hexamethylenediamine, and 3.2 Kg/h of water were fed together into a pulping kettle 9 and continuously pulped at 70° C. to form a slurry. The slurry was conveyed to a multi-stage stirring and dissolving kettle 14 via a pump 10, and heated to 160° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.0 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 180° C., the moisture content was controlled at 13%, and the residence time for dehydration was 30 min., The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine, 0.045 Kg/h (0.75 mol/h) of acetic acid as the molecular weight regulator, 0.153 Kg/h (0.5 mol/h) of 3-(3,5-di-tert-butyl-4-hydroxyphenyl)valeric acid, 0.0118 Kg/h (90 ppm P) of P-(4-carboxybutylphenyl)phosphinic acid and P-phenyl-phosphinic acid (50% of the acid was neutralized with NaOH) were used to adjust the amine/acid molar ratio to 1.04. Thereafter, the material was pressurized to 15 MPa by a pump 32, conveyed to a preheater (heat exchanger) 33 for preheating to a temperature of 290° C., and held and reacted at 290° C. for 15 min in a pre-polymerization reactor 34; and after being depressurized to 0.3 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 290 to 320° C. and the residence time for reaction was 6 min. The material obtained after polycondensation reaction was pelleted in an underwater pelletizer 39 and then dried by a drier 40 to obtain a semi-aromatic polyamide product at about 12.4 Kg/h.

Example 5

In an amine/acid molar ratio of 0.92 in the initial charge, 4.66 Kg/h (27.5 mol/h) of terephthalic acid, 3.29 Kg/h (22.5 mol/h) of adipic acid, 5.34 Kg/h (46.0 mol/h) of hexamethylenediamine, and 3.2 Kg/h of water were fed together into a pulping kettle 9 and continuously pulped at 70° C. to form a slurry. The slurry was conveyed to a multi-stage stirring and dissolving kettle 14 via a pump 10, and heated to 160° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.0 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 180° C., the moisture content was controlled at 13%, and the residence time for dehydration was 30 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine, 0.06 Kg/h (1.0 mol/h) of acetic acid as the molecular weight regulator, 0.153 Kg/h (0.5 mol/h) of 3-(3,5-di-tert-butyl-4-hydroxyphenyl)valeric acid, 0.0118 Kg/h of P-(4-carboxybutylphenyl)phosphinic acid and P-phenyl-phosphinic acid (50% of the acid was neutralized with NaOH, 90 ppm P) were used to adjust the amine/acid molar ratio to 1.04. Thereafter, the material was pressurized to 15 MPa by a pump 32, conveyed to a preheater (heat exchanger) 33 for preheating to a temperature of 290° C., and held and reacted at 290° C. for 15 min in a pre-polymerization reactor 34; and after being depressurized to 0.7 MPa via a reducing valve 35, the pre-polymerization reaction solution entered a flash vaporizer 36. The molten liquid material after flash vaporization was subjected to spray drying to obtain a prepolymer. The prepolymer was subjected to a solid phase polycondensation reaction in a rake drier at 200 to 250° C. for 20 h to obtain a semi-aromatic polyamide product at about 12.4 Kg/h.

Example 6

In an amine/acid molar ratio of 1.04 in the initial charge, 49.8 Kg (300 mot) of terephthalic acid. 16.6 Kg (100 mol) of isophthalic acid, 14.6 Kg (100 mol) of adipic acid, 92.2 Kg (536 mol) of decamethylenediamine, 0.6 Kg (10 mol) of acetic acid as a molecular weight regulator, 1.53 Kg (5 mol) of 3-(3,5-di-tert-butyl-4-hydroxyphenyl)valeric acid, 0.118 Kg of P-(4-carboxybutylphenyl)phosphinic acid and P-phenyl-phosphinic acid (50% of the acid was neutralized with NaOH, 90 ppm P), and 50 Kg of water were fed together into a salt-forming kettle 41 or 42 (switched every 5 h), and heated to 170° C. for dissolution and salt forming. The aforesaid salt solution was pressurized to 2.0 MPa by a pump 43 at a flow rate of 19.0 Kg/h and then mixed with the material conveyed by a circulating pump 45 and heated before being conveyed to a preheater 44 of a dehydrator; and the resultant was dehydrated in a dehydrator 46, where the dehydration temperature was controlled at 260° C., the moisture content was controlled at 5%, and the residence time for dehydration was 10 min. The eligibly dehydrated material was pressurized to 27 MPa by a pump 48, conveyed to a preheater 49 for preheating to a temperature of 320° C., and held and reacted at 320° C. for 3 min in a pre-polymerization reactor 50; and after being depressurized to 0.9 MPa via a reducing valve 51, the pre-polymerization reaction solution entered a flash vaporizer 52. The molten liquid material after flash vaporization was depressurized to the atmospheric pressure via a reducing valve 53 and then entered a double-screw extruder 54 for polycondensation reaction, where the reaction temperature was 320 to 330° C. and the residence time for reaction was 3 min. The material obtained after polycondensation reaction was pelleted in an underwater pelletizer 55 and then dried by a drier 56 to obtain a semi-aromatic polyamide product at about 12.6 Kg/h.

Comparative Example 1

In an amine/acid molar ratio of 0.92 in the initial charge, 4.66 Kg/h (27.5 mol/h) of terephthalic acid. 3.29 Kg/h (22.5 mol/h) of adipic acid, 5.34 Kg/h (46.0 mol/h) of hexamethylenediamine, 0.0024 Kg/h of phosphinic acid (50% of the acid was neutralized with NaOH, equivalent to 90 ppm P), and 3.2 Kg/h of water were fed together into a pulping kettle 9 and continuously pulped at 70° C. to form a slurry. The slurry was conveyed to a multi-stage stirring and dissolving kettle 14 via a pump 10, and heated to 160° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.0 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 180° C., the moisture content was controlled at 13%, and the residence time for dehydration was 30 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine and 0.03 Kg/h (0.5 mol/h) of acetic acid as the molecular weight regulator were used to adjust the amine/acid molar ratio to 1.04. Thereafter, the material was pressurized to 15 MPa by a pump 32, conveyed to a preheater (heat exchanger) 33 for preheating to a temperature of 290° C., and held and reacted at 290° C. for 15 min in a pre-polymerization reactor 34; and after being depressurized to 0.3 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 290 to 320° C. and the residence time for reaction was 6 min. The material obtained after polycondensation reaction was pelleted in an underwater pelletizer 39 and then dried by a drier 40 to obtain a semi-aromatic polyamide product at about 12.4 Kg/h.

Comparative Example 2

In an amine/acid molar ratio of 0.98 in the initial charge, 4.98 Kg/h (30 mol/h) of terephthalic acid, 1.66 Kg/h (10 mol/h) of isophthalic acid, 1.46 Kg/h (10 mol/h) of adipic acid, 8.43 Kg/h (49.0 mol/h) of decamethylenediamine, 0.0019 Kg/h of phosphinic acid (70 ppm P) and 5.0 Kg/h of water were fed together into a pulping kettle 9 and continuously pulped at 90° C. to form a slurry. The slurry was conveyed to a multi-stage stirring and dissolving kettle 14 via a pump 10, and heated to 170° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.5 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 240° C., the moisture content was controlled at 10%, and the residence time for dehydration was 10 min. The steam generated from the dehydrator was used as the heat source of the multi-stage stirring and W dissolving kettle 14 and was cooled by a heat exchanger 15, and then the amine content therein was detected by an online Raman spectrometer 16. The amount of the molten decamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten decamethylenediamine and 0.122 Kg/h (1.0 mol/h) of benzoic acid as the molecular weight regulator were used to adjust the amine/acid molar ratio to 1.06. Thereafter, the material was pressurized to 30 MPa by a pump 32, conveyed to a preheater (heat exchanger) 33 for preheating to a temperature of 350° C., and held and reacted at 350° C. for 1 min in a pre-polymerization reactor 34; and after being depressurized to 0.5 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 320 to 330° C. and the residence time for reaction was 1 min. The material obtained after polycondensation reaction was pelleted in an underwater pelletizer 39 and then dried by a drier 40 to obtain a semi-aromatic polyamide product at about 15.3 Kg/h.

Comparative Example 3

In an amine/acid molar ratio of 0.92 in the initial charge, 4.66 Kg/h (27.5 mol/h) of terephthalic acid, 3.29 Kg/h (22.5 mol/h) of adipic acid, 5.34 Kg/h (46.0 mol/h) of hexamethylenediamine, and 3.2 Kg/h of water were fed together into a pulping kettle 9 and continuously pulped at 70° C. to form a slurry. The slurry was conveyed to a multi-stage stirring and dissolving kettle 14 via a pump 10, and heated to 160° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.0 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 180° C., the moisture content was controlled at 13%, and the residence time for dehydration was 30 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine, 0.03 Kg/h (0.5 mol/h) of acetic acid as the molecular weight regulator, and 0.153 Kg/h (0.5 mol/h) of 3-(3,5-di-tert-butyl-4-hydroxyphenyl)valeric acid were used to adjust the amine/acid molar ratio to 1.04. Thereafter, the material was pressurized to 15 MPa by a pump 32, conveyed to a preheater (heat exchanger) 33 for preheating to a temperature of 290° C., and held and reacted at 290° C. for 15 min in a pre-polymerization reactor 34; and after being depressurized to 0.3 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 290 to 320° C. and the residence time for reaction was 6 min. The material obtained after polycondensation reaction was pelleted in an underwater pelletizer 39 and then dried by a drier 40 to obtain a semi-aromatic polyamide product at about 12.4 Kg/h.

Comparative Example 4

In an amine/acid molar ratio of 0.92 in the initial charge, 4.66 Kg/h (27.5 mol/h) of terephthalic acid, 3.29 Kg/h (22.5 mol/h) of adipic acid, 5.34 Kg/h (46.0 mol/h) of hexamethylenediamine, and 3.2 Kg/h of water were fed together into a pulping kettle 9 and continuously pulped at 70° C. to form a slurry. The slurry was conveyed to a multi-stage stirring and dissolving kettle 14 via a pump 10, and heated to 160° C. with the steam generated in the dehydration process for dissolution and salt forming. The composition of the dibasic acid in the salt solution was detected by an online Raman spectrometer 18. The amount of the aliphatic dibasic acid was adjusted by the molten adipic acid via a metering pump 23, so that the ratio of the aromatic dibasic acid to the aliphatic dibasic acid in a dissolving and salt-forming kettle 19 remained stable. After the composition of the aforementioned salt solution was detected by an online Raman spectrometer 20, the salt solution was pressurized to 1.0 MPa by a pump 24 and then mixed with the material conveyed by a circulating pump 28 and heated before being conveyed to a preheater (heat exchanger) 27 of a dehydrator; and the resultant was dehydrated in a dehydrator 29, where the dehydration temperature was controlled at 180° C., the moisture content was controlled at 13%, and the residence time for dehydration was 30 min. The steam generated from the dehydrator was used as the heat source of the multi-stage stirring and dissolving kettle 14 and was cooled by a heat exchanger 15, and then the amine content therein was detected by an online Raman spectrometer 16. The amount of the molten hexamethylenediamine required to be replenished before a pump 32 was determined by a controller 21 with reference to the detection results obtained from the Raman spectrometers 16 and 20. The eligibly dehydrated material passed through a pump 17 and a pump 30, respectively. The molten hexamethylenediamine, 0.03 Kg/h (0.5 mol/h) of acetic acid as the molecular weight regulator, and 0.0118 Kg/h of P-(4-carboxybutylphenyl)phosphinic acid and P-phenyl-phosphinic acid (50% of the acid was neutralized with NaOH, 90 ppm P) were used to adjust the amine/acid molar ratio to 1.04. Thereafter, the material was pressurized to 15 MPa by a pump 32, conveyed to a preheater (heat exchanger) 33 for preheating to a temperature of 290° C., and held and reacted at 290° C. for 15 min in a pre-polymerization reactor 34; and after being depressurized to 0.3 MPa via a reducing valve 35, the pre-polymerization reaction solution entered a flash vaporizer 36. The molten liquid material after flash vaporization was depressurized to the atmospheric pressure via a reducing valve 37 and then entered a double-screw extruder 38 for polycondensation reaction, where the reaction temperature was 290 to 320° C. and the residence time for reaction was 6 min. The material obtained after polycondensation reaction was pelleted in an underwater pelletizer 39 and then dried by a drier 40 to obtain a semi-aromatic polyamide product at about 12.4 Kg/h.

TABLE 1

|  | Ex. 1 | Ex. 2 | Ex. 3 | Ex. 4 | Ex. 5 | E. 6 | Comp Ex. 1 | Comp Ex. 2 | Comp Ex. 3 | Comp Ex. 4 |
|---|---|---|---|---|---|---|---|---|---|---|
| Intrinsic viscosity/dl · g$^{-1}$ | 0.93 | 0.82 | 0.88 | 0.92 | 0.9 | 0.87 | 0.86 | 0.8 | 0.85 | 0.86 |
| Glass transition temperature/° C. | 96 | 92 | 99 | 97 | 96 | 91 | 96 | 91 | 95 | 96 |
| Melting point/° C. | 309 | 303 | 313 | 310 | 309 | 302 | 309 | 302 | 308 | 309 |
| MV$_{30}$/MV$_{6}$/% | 97 | 96 | 95 | 97 | 96 | 95 | 89 | 88 | 87 | 90 |
| P content in resin/ppm | 90 | 70 | 50 | 90 | 90 | 90 | 90 | 70 | 0 | 90 |
| Terminal amino group/mmol · kg$^{-1}$ | 36 | 98 | 75 | 47 | 62 | 89 | 66 | 113 | 92 | 52 |
| Terminal carboxyl group/mmol · kg$^{-1}$ | 7.1 | 5.7 | 6.3 | 8.4 | 12 | 9.3 | 9.7 | 7.8 | 9.9 | 11 |
| Yellowness index | 13.6 | 17.2 | 13.1 | 15.3 | 17.5 | 18.5 | 28.7 | 38.1 | 22.5 | 23.3 |

As could be appreciated from the results in Table 1, compared with the semi-aromatic polyamides obtained in the case of adding a phosphinic acid catalyst alone or not adding any phosphorus-containing catalyst, the semi-aromatic polyamides obtained in the case of adding the end-capping agents of the present disclosure were capable of maintaining good thermal stability and having a relatively low yellowness index, and polyamides obtained when both special end-capping agents and a reactive group-containing hindered phenolic antioxidant were added had better thermal stability, in comparison to those obtained when only either of them was added.

What is claimed is:

1. A semi-aromatic polyamide comprised of structural units derived from a diamine, a dibasic carboxylic acid and a mono carboxylic acid and end-capped structures derived from the following formula (I) and formula (II), wherein the formula (I) is selected from compounds represented by the following formula (I-1) and/or formula (I-2):

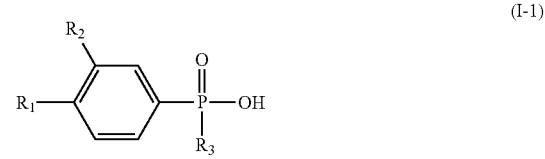

(I-1)

-continued

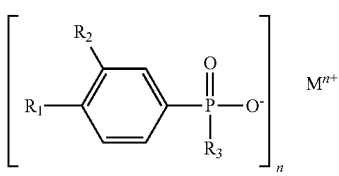

wherein $R_1$ is a carboxyl group, or a carboxyl-substituted $C_1$-$C_{10}$ alkyl group; $R_2$ is a $C_1$-$C_4$ alkyl group or H; $R_3$ is selected from a $C_6$-$C_9$ aryl group or H; n is 1 or 2 and corresponds to a cation of $M^{n+}$; and $M^{n+}$ is selected from +1- and +2-valent metal cations; the formula (II) is:

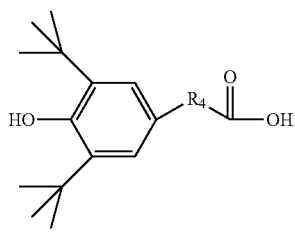

wherein $R_4$ is selected from a $C_1$-$C_{10}$ alkyl group, and wherein total phosphorus content in per unit mass of the semi-aromatic polyamide is not greater than 200 ppm.

2. The semi-aromatic polyamide according to claim 1, wherein the formula (I) is represented by at least formula (1-2), and wherein the metal cation is $Na^+$ or $K^+$.

3. The semi-aromatic polyamide according to claim 1, wherein a molar ratio between the compounds represented by formula (I-1) and formula (I-2) is from 10:0 to 2:8.

4. The semi-aromatic polyamide according to claim 1, wherein a molar content of a structure derived from the formula (II) is from 0.1 to 2.0% of a molar content of a structure derived from the dibasic carboxylic acid.

5. The semi-aromatic polyamide according to claim 1, wherein a mole number of a structure derived from the mono carboxylic acid is from 1 to 5% with respect to a total mole number of a structure derived from the dibasic carboxylic acid.

6. The semi-aromatic polyamide according to claim 1, wherein the dibasic carboxylic acid includes an aromatic dibasic carboxylic acid and optionally one or more aliphatic dibasic carboxylic acids, and a molar ratio between the aromatic dibasic carboxylic acid and the aliphatic dibasic carboxylic acid is from 100:0 to 50:50.

7. The semi-aromatic polyamide according to claim 1, wherein the semi-aromatic polyamide has active end groups and the concentrations of the active end groups satisfy: $[NH_2]/[COOH]>5$, and in the semi-aromatic polyamide, $[COOH]$ has a concentration of not higher than 20 mmol/kg.

8. The semi-aromatic polyamide according to claim 1, wherein the semi-aromatic polyamide has a thermal stability index $MV_{30}/MV_6$ of greater than 95%, a yellowness index of less than 20, a glass transition temperature of 90° C. or above, and a melting point of 300° C. or above.

9. A resin composition, comprising:
the semi-aromatic polyamide according to claim 1, and optionally other resins, reinforcing components, or additives.

10. An article prepared from the composition according to claim 9.

11. The article according to claim 10, which is an automobile part or a part for use in electrical industry.

12. The article according to claim 10, which is a spare part for a fuel pipeline in an automobile, or a LED panel.

13. The semi-aromatic polyamide of claim 1, wherein the dibasic carboxylic acid comprises one or more of succinic acid, glutaric acid, adipic acid, suberic acid, azelaic acid, sebacic acid, or dodecanedioic acid.

14. The semi-aromatic polyamide of claim 1, wherein the mono carboxylic acid comprises one or more of acetic acid, propionic acid, butyric acid, valeric acid, caproic acid, octanoic acid, capric acid, lauric acid, palm acid, palmitic acid, stearic acid, benzoic acid, or phenylacetic acid.

15. A method for preparing a semi-aromatic polyamide, wherein in the method, a diamine, a dibasic carboxylic acid and a mono carboxylic acid are used as main raw materials and are subjected to polymerization in the presence of end-capping agents that are as represented by the structures of the following formula (I) and formula (II),
wherein the formula (I) is selected from compounds represented by the following formula (1-1) and/or formula (1-2):

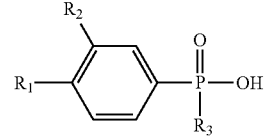

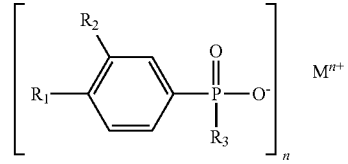

wherein $R_1$ is a carboxyl group or a carboxyl-substituted $C_1$-$C_{10}$ alkyl group; $R_2$ is a $C_1$-$C_4$ alkyl group or H; $R_3$ is selected from a $C_6$-$C_9$ aryl group or H; n is 1 or 2 and corresponds to a cation of $M^{n+}$; and $M^{n+}$ is selected from +1- and +2-valent metal cations; the formula (II) is:

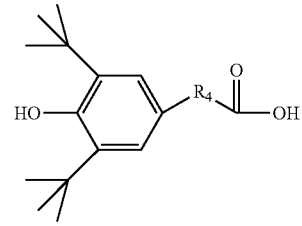

wherein $R_4$ is selected from a $C_1$-$C_{10}$ alkyl group, and wherein total phosphorus content in per unit mass of the semi-aromatic polyamide is not greater than 200 ppm.

16. The method according to claim 15, comprising:
a salt forming reaction: subjecting an initial charge of the diamine and the dibasic carboxylic acid in an amine/acid molar ratio of less than 1 to form a salt solution with water;

a pre-polymerization reaction: adjusting the amine/acid molar ratio in the salt solution to be larger than 1.03 with the diamine, the monoacid and the end-capping agents and performing the pre-polymerization reaction to obtain a pre-polymerization reaction solution; and a polycondensation reaction: subjecting the pre-polymerization reaction solution to the polycondensation reaction.

17. The method according to claim 16, wherein in the salt forming reaction, the amine/acid molar ratio of the initial charge is from 0.90 to 0.99.

18. The method according to claim 16, wherein the salt forming reaction further comprises detecting a composition of the dibasic carboxylic acid in the salt solution and adding an aromatic dibasic carboxylic acid and/or an aliphatic dibasic carboxylic acid to stabilize the composition; and the pre-polymerization reaction further comprises detecting a composition of the pre-polymerization reaction solution, and detections are all conducted by online Raman spectroscopy.

19. The method according to claim 16, wherein the amine/acid molar ratio in the pre-polymerization reaction is from 1.03 to 1.07.

20. The method according to claim 16, further comprising subjecting the salt solution to dehydration prior to the pre-polymerization reaction, wherein the dehydration is conducted at a temperature ranging from 180 to 240° C. and under a pressure ranging from 0.8 to 1.5 MPa, and the dehydration lasts for 10 to 30 min; the pre-polymerization reaction is conducted at a temperature ranging from 280 to 350° C. and under a pressure ranging from 15 to 30 MPa, and the pre-polymerization reaction lasts for 1 to 15 min; the polycondensation reaction is conducted at a reaction temperature ranging from 290 to 350° C., and the polycondensation reaction lasts for 0.5 to 7 min.

* * * * *